United States Patent
Palmateer

(10) Patent No.: US 9,683,831 B2
(45) Date of Patent: Jun. 20, 2017

(54) RING LASER MEASUREMENT APPARATUS AND METHOD

(71) Applicant: The Boeing Company, Chicago, IL (US)

(72) Inventor: John W. Palmateer, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 14/665,622

(22) Filed: Mar. 23, 2015

(65) Prior Publication Data
US 2016/0282104 A1    Sep. 29, 2016

(51) Int. Cl.
| | | |
|---|---|---|
| G01B 11/06 | (2006.01) | |
| G01S 17/08 | (2006.01) | |
| G01S 7/48 | (2006.01) | |
| G01S 17/88 | (2006.01) | |
| G01S 7/481 | (2006.01) | |
| G01S 17/32 | (2006.01) | |

(52) U.S. Cl.
CPC ............ *G01B 11/06* (2013.01); *G01S 7/4808* (2013.01); *G01S 7/4812* (2013.01); *G01S 7/4813* (2013.01); *G01S 17/08* (2013.01); *G01S 17/325* (2013.01); *G01S 17/88* (2013.01)

(58) Field of Classification Search
CPC ... G01B 11/06; G01B 11/2441; G01B 11/306; G01B 9/02021; G01B 9/02027; G01B 9/02028; G01B 2290/45
See application file for complete search history.

(56) References Cited

U.S. PATENT DOCUMENTS

| | | | |
|---|---|---|---|
| 4,068,955 A | 1/1978 | Bodlaj | |
| 4,192,612 A | 3/1980 | Bodlaj | |
| 6,937,350 B2* | 8/2005 | Shirley | G01B 11/06 356/485 |
| 2006/0139656 A1* | 6/2006 | Kulawiec | G01B 11/06 356/512 |

OTHER PUBLICATIONS

Lu et al., "Measuring the thickness of opaque plane-parallel parts using an external cavity diode laser and a double-ended interferometer," *Optics Communications*, vol. 226, pp. 7-13 (2003).

* cited by examiner

*Primary Examiner* — Luke Ratcliffe
(74) *Attorney, Agent, or Firm* — Walters & Wasylyna LLC

(57) ABSTRACT

A measurement apparatus including a housing having a first arm and a second arm spaced apart from the first arm to define a measurement zone therebetween, and a laser radar unit, wherein the laser radar unit emits a laser beam that is split into a first beam and a second beam, the first beam travels through the first arm, across the measurement zone and into the second arm, while the second beam travels through the second arm, across the measurement zone and into the first arm, thereby forming a closed optical path, and wherein the closed optical path includes a midpoint that is offset from the measurement zone such that the first beam travels a first optical path and the second beam travels a second, longer optical path when the closed optical path is broken by a part positioned in the measurement zone.

20 Claims, 7 Drawing Sheets

RING LASER MEASUREMENT APPARATUS AND METHOD

FIELD

This application relates to apparatus and methods for measuring the thickness of a part and, more particularly, to the use of a laser for measuring the thickness of a part.

BACKGROUND

During aircraft manufacturing, it often becomes necessary to measure the thickness of various parts. For example, to pass inspection, the skin on the wing of an aircraft typically must have a thickness within a predetermined range, which may depend on various factors, such as the composition of the skin and the size of the wing. A skin that is too thin may not satisfy structural requirements. A skin that is too thick may unnecessarily increase the overall weight of the aircraft, thereby increasing operating (e.g., fuel) costs. Therefore, the thickness of an aircraft wing skin is commonly measured during aircraft manufacturing and/or aircraft servicing.

Several techniques are currently available for measuring the thickness of a part. As one example, an ultrasonic device may be used to transmit a sound pulse through the part and then, based on the delay of the returned echo and the speed of sound through the part, may calculate the thickness of the part. However, ultrasonic thickness measurement devices require direct contact with the part. Indeed, a conductive material is often used between the part and the ultrasound transducer to ensure close contact and minimize acoustic power loss. Therefore, ultrasonic thickness measurement devices may be cumbersome and may slow the measurement process, thereby creating process inefficiencies. Additionally, ultrasonic thickness measurements vary based upon slight variations in the parts (e.g., differences in the crystal structures of metal parts).

Triangulation sensors provide a non-contact option for measuring thickness. However, triangulation sensors can be difficult to calibrate. Furthermore, it can be difficult to maintain the required separation of the triangulation sensors, particularly when measuring a part as large as an aircraft wing skin.

Accordingly, those skilled in the art continue with research and development efforts in the present field.

SUMMARY

In one embodiment, the disclosed ring laser measurement apparatus may include a housing including a first arm and a second arm spaced apart from the first arm to define a measurement zone therebetween, and a laser radar unit, wherein the laser radar unit emits a laser beam and the laser beam is split into a first beam and a second beam, the first beam travels through the first arm, across the measurement zone and into the second arm, returning to the laser radar unit, while the second beam travels through the second arm, across the measurement zone and into the first arm, returning to the laser radar unit, thereby forming a closed optical path, and wherein the closed optical path includes a midpoint, the midpoint being offset from the measurement zone such that the first beam travels a first optical path and the second beam travels a second optical path when the closed optical path is broken by a part positioned in the measurement zone, the second optical path being greater than the first optical path.

In another embodiment, the disclosed ring laser measurement apparatus may include a housing including a first arm and a second arm spaced apart from the first arm to define a measurement zone therebetween, a laser radar unit, wherein the laser radar unit emits a laser beam, a beam splitter positioned to split the laser beam into a first beam and a second beam, and a plurality of mirrors arranged to direct the first beam into the second beam to form a closed optical path that extends through the measurement zone, the closed optical path comprising a midpoint, wherein the midpoint is outside of the measurement zone.

In another embodiment, the disclosed ring laser measurement apparatus may include a housing including a first arm and a second arm spaced apart from the first arm to define a measurement zone therebetween, a laser radar unit, wherein the laser radar unit emits a laser beam, a first optical fiber optically coupled with the laser radar unit to receive a first portion of the laser beam corresponding to a first beam, the first optical fiber extending through the first arm, and a second optical fiber optically coupled with the laser radar unit to receive a second portion of the laser beam corresponding to a second beam, the second optical fiber extending through the second arm and being longer than the first optical fiber, wherein the first beam exits the first optical fiber, travels across the measurement zone and enters the second optical fiber, and the second beam exits the second optical fiber, travels across the measurement zone and enters the first optical fiber, thereby forming a closed optical path.

In yet another embodiment, disclosed is a method for measuring a thickness of a part using a laser radar unit that emits a laser beam. The method may include steps of (1) splitting the laser beam into a first beam and a second beam; (2) directing the first beam into the second beam to form a closed optical path, the closed optical path having a total length; (3) breaking the closed optical path with the part such that the first beam travels in a first optical path having a first length and the second beam travels in a second optical path having a second length, wherein the second length is greater than the first length; and (4) calculating the thickness based on the total length minus one-half of the first length and one-half of the second length.

Other embodiments of the disclosed ring laser measurement apparatus and method will become apparent from the following detailed description, the accompanying drawings and the appended claims.

DETAILED DESCRIPTION

Figure 1:
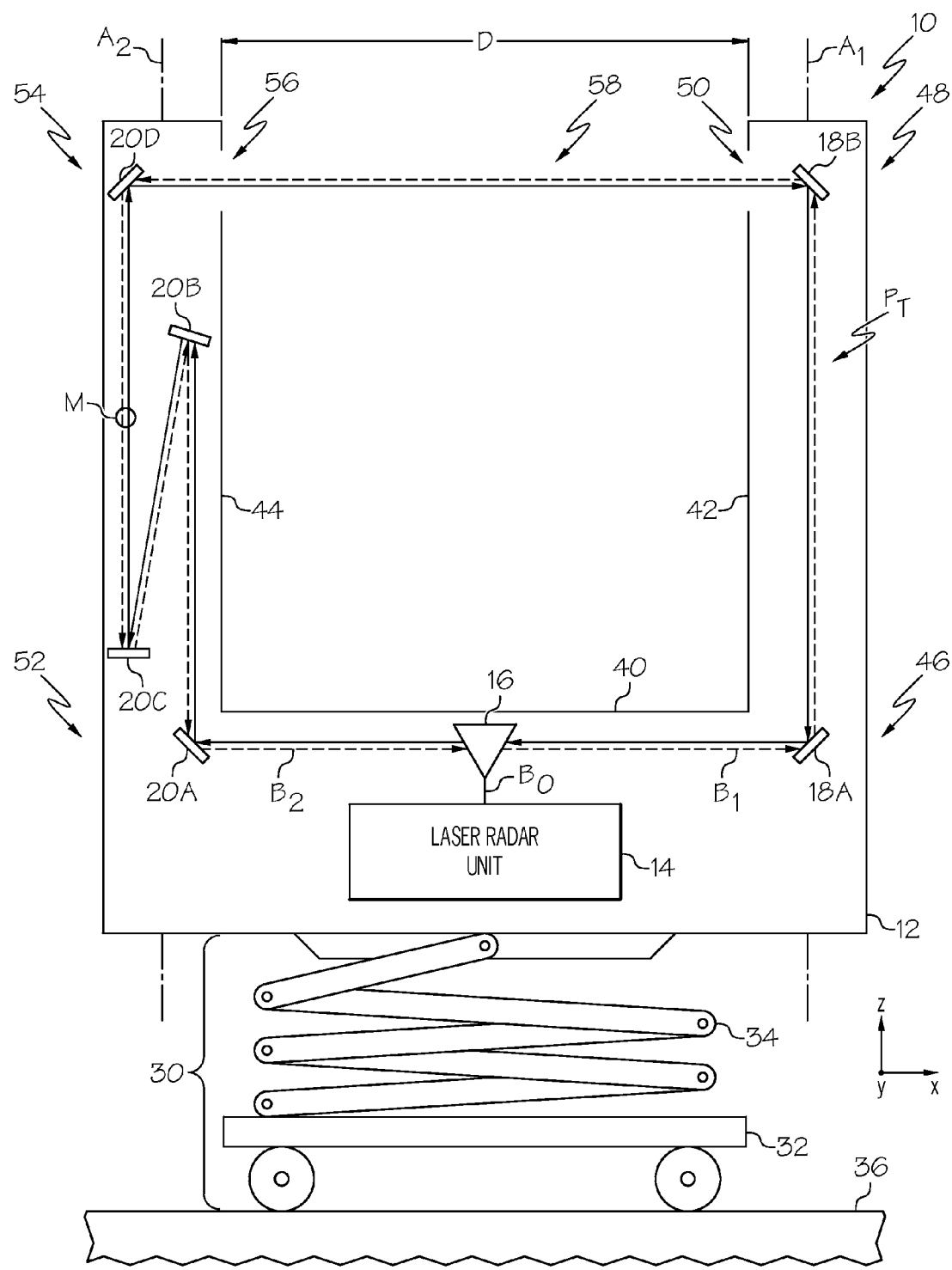
FIG. 1 is a schematic representation of one embodiment of the disclosed ring laser measurement apparatus.

Referring to FIG. 1, one embodiment of the disclosed ring laser measurement apparatus, generally designated 10, may include a housing 12, a laser radar unit 14, a beam splitter 16, a first set of mirrors 18A, 18B and a second set of mirrors 20A, 20B, 20C, 20D. The laser radar unit 14, the beam splitter 16, the first set of mirrors 18A, 18B and the second set of mirrors 20A, 20B, 20C, 20D may be housed within the housing 12. Therefore, the housing 12 may protect the laser radar unit 14, the beam splitter 16, the first set of mirrors 18A, 18B and the second set of mirrors 20A, 20B, 20C, 20D from ambient conditions, and may also facilitate arranging the laser radar unit 14, the beam splitter 16, the first set of mirrors 18A, 18B and the second set of mirrors 20A, 20B, 20C, 20D as described herein.

Figure 2:
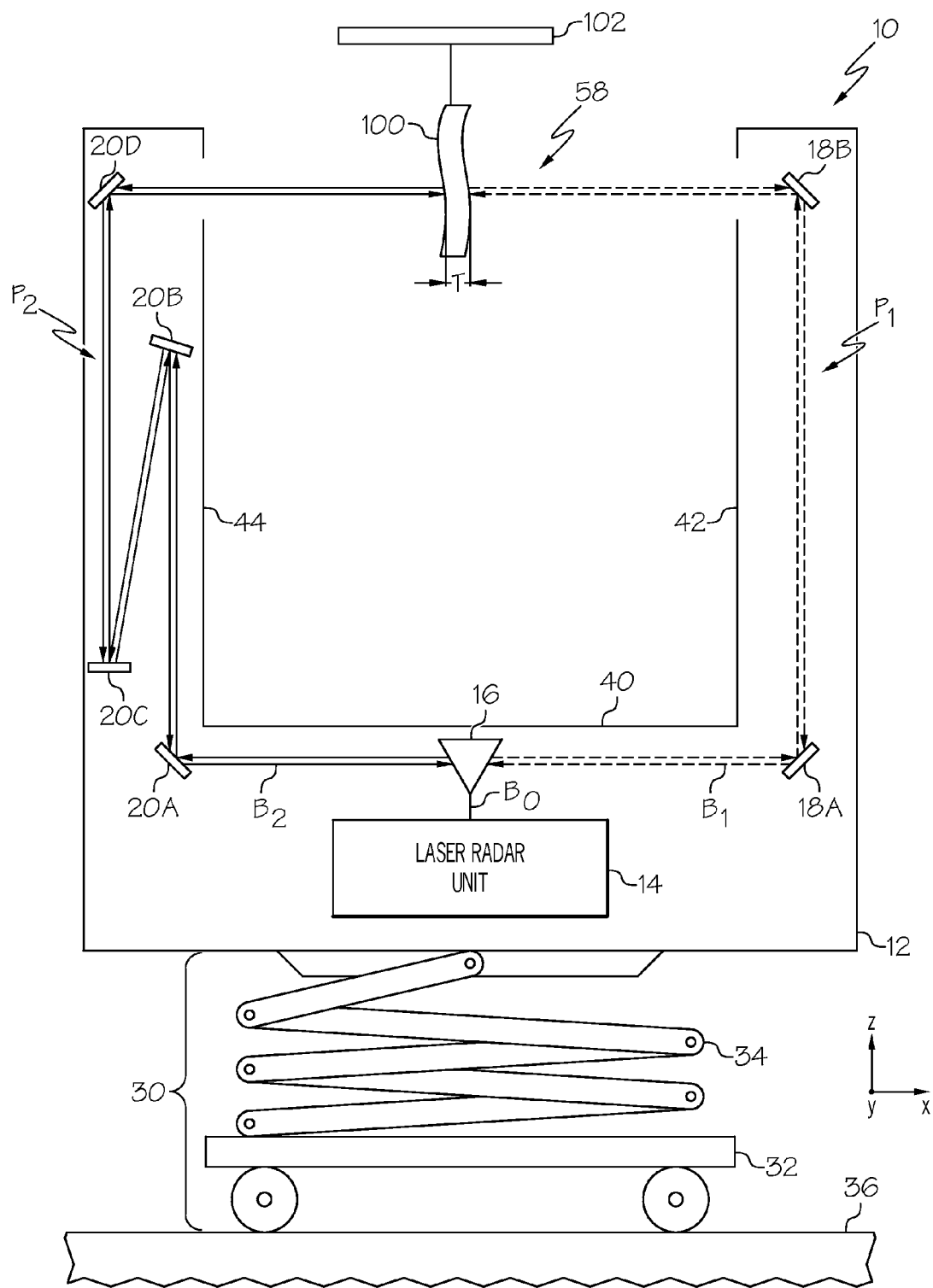
FIG. 2 is a schematic representation of the ring laser measurement apparatus of FIG. 1, shown with a part positioned in the measurement zone.

The housing 12 may optionally be connected to a support structure 30. The support structure 30 may facilitate positioning the housing 12 relative to a part 100, as shown in FIG. 2, such that a thickness measurement of the part may be taken. The support structure 30 may facilitate manually positioning the housing 12 relative to a part 100 (e.g., the support structure 30 may include a handle capable of being grasped by a human). Alternatively, the support structure 30 may facilitate automated positioning of the housing 12 relative to a part 100.

In one particular implementation, the support structure 30 may include a translation unit 32 and a lifting unit 34. The translation unit 32 of the support structure 30 may facilitate movement of the housing 12 along the x-axis and the y-axis, such as along a surface 36 (e.g., a factory floor). The lifting unit 34 of the support structure 30 may facilitate movement of the housing 12 along the z-axis. Additionally, the lifting unit 34 of the support structure 30 may facilitate rotational movement of the housing 12 about the z-axis.

Still referring to FIG. 1, the housing 12 may include a base portion 40, a first arm 42 and a second arm 44. The support structure 30 may be connected to the base portion 40 of the housing 12. The laser radar unit 14 and the beam splitter 16 may be housed within the base portion 40 of the housing 12.

The housing 12 may be constructed from various materials without departing from the scope of the present disclosure. As one example, the housing 12 may be formed from a polymeric material, such as by molding. As another example, the housing 12 may be formed as a composite, such as a corrugated substrate covered with a thin face sheet. As yet another example, the housing 12 may be formed from a metal or metal alloy, such as by molding, casting and/or machining.

The first arm 42 of the housing 12 may be elongated (e.g., along a first arm axis $A_1$), and may include a proximal end 46 and a distal end 48. The proximal end 46 of the first arm 42 of the housing 12 may be connected to the base portion 40. The distal end 48 of the first arm 42 of the housing 12 may be opposed from the proximal end 46, and may define a first aperture 50 therein.

The second arm 44 of the housing 12 may be elongated (e.g., along a second arm axis $A_2$), and may include a proximal end 52 and a distal end 54. The proximal end 52 of the second arm 44 of the housing 12 may be connected to the base portion 40. The distal end 54 of the second arm 44 of the housing 12 may be opposed from the proximal end 52, and may define a second aperture 56 therein.

The distal end 54 of the second arm 44 of the housing 12 may be laterally spaced a distance D from the distal end 48 of the first arm 42 such that the second aperture 56 of the second arm 44 is in facing alignment with the first aperture 50 of the first arm 42. Therefore, a measurement zone 58 may be defined between the distal end 48 of the first arm 42 and the distal end 54 of the second arm 44. The measurement zone 58 may have a length corresponding to distance D.

The distance D between the distal end 48 of the first arm 42 and the distal end 54 of the second arm 44 may be of a sufficient magnitude to accommodate a part (e.g., part 100 shown in FIG. 2) therebetween without the part contacting the first and second arms 42, 44. As one specific, non-limiting example, the distance D between the distal end 48 of the first arm 42 and the distal end 54 of the second arm 44 may range from about 6 inches to about 10 feet. As another specific, non-limiting example, the distance D between the distal end 48 of the first arm 42 and the distal end 54 of the second arm 44 may range from about 1 foot to about 5 feet. As yet another specific, non-limiting example, the distance D between the distal end 48 of the first arm 42 and the distal end 54 of the second arm 44 may be about 2 feet.

While the first and second arms 42, 44 of the housing 12 are shown in FIGS. 1 and 2 extending straight outward from the base portion 40, those skilled in the art will appreciate that the first and second arms 42, 44 need not necessarily be straight. Various non-straight configurations (e.g., curved configurations, or even irregular configurations) may be used without departing from the scope of the present disclosure. The first and second arms 42, 44 merely need to align the first and second apertures 50, 56 to establish the measurement zone 58 between the first and second arms 42, 44.

The laser radar unit 14 may be positioned, at least partially, within the base portion 40 of the housing 12. When actuated, the laser radar unit 14 may emit a laser beam $B_0$. The laser beam $B_0$ may be chirped such that its frequency is changed in a controlled manner. The beat frequency created by processor 60 (employing a heterodyne process) may be based on the difference in frequencies caused by different times of flight between an object (e.g., part 100 shown in FIG. 2) and a reference. Therefore, the laser beam $B_0$ may have a wide range of "center" frequencies about which there is a range of chirped frequencies.

Figure 4:
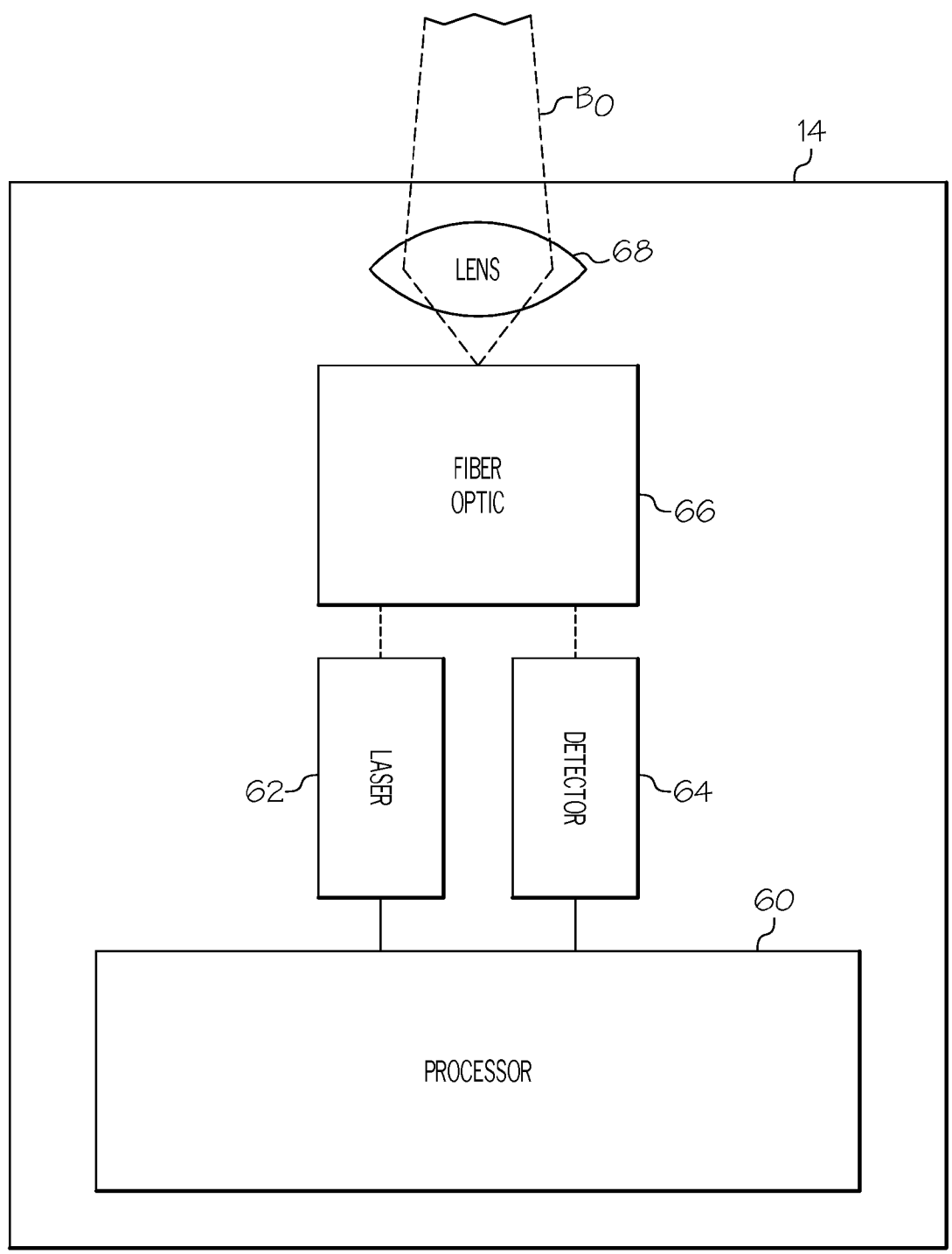
FIG. 4 is a simplified block diagram of the laser radar unit of the ring laser measurement apparatus of FIG. 1.

Referring to FIG. 4, in one particular construction, the laser radar unit 14 may include a processor 60, a laser 62, a detector 64, a fiber optic 66 and a lens 68. The laser 62 may be positioned to output a laser beam $B_0$, which may pass through the fiber optic 66 and the lens 68. The detector 64 (e.g., a photodetector) may be positioned to receive a reflected beam, which may pass to the detector 64 by way of the lens 68 and the fiber optic 66. The processor 60 may be in communication with the laser 62 and the detector 64 to calculate a travel distance of the laser beam $B_0$. For example, the processor 60 may employ a heterodyne detection technique to calculate the distance based on the output beam $B_0$ (or an associated reference beam) and the received/detected reflected beam (e.g., using two fast Fourier transform (FFT) algorithms running simultaneously).

Referring back to FIG. 1, the beam splitter 16 may also be positioned in the base portion 40 of the housing 12. The beam splitter 16 may be positioned relative to the laser radar unit 14 to receive the laser beam $B_0$ from the laser radar unit 14 and split the laser beam $B_0$ into a first beam $B_1$ and a second beam $B_2$. The first beam $B_1$ is shown in FIGS. 1 and 2 leaving the beam splitter 16 (toward the first arm 42) as a broken line and the second beam $B_2$ is shown leaving the beam splitter 16 (toward the second arm 44) as a solid line. Various optical devices, such as prisms, slivered mirrors and the like, (or combinations of optical devices) may be used as the beam splitter 16.

The first set of mirrors 18A, 18B may be positioned within the housing 12, specifically within the base portion 40 and the first arm 42, to receive the first beam $B_1$ from the beam splitter 16 and direct the first beam $B_1$ through the first arm 42 and, ultimately, through the first aperture 50 toward the second aperture 56. The particular arrangement and angle-of-attack of the mirrors 18A, 18B may be dictated by the shape of the first arm 42, among other possible factors. Furthermore, while only two mirrors 18A, 18B are shown, fewer or additional mirrors may be used without departing from the scope of the present disclosure.

The second set of mirrors 20A, 20B, 20C, 20D may be positioned within the housing 12, specifically within the base portion 40 and the second arm 44, to receive the second beam $B_2$ from the beam splitter 16 and direct the second beam $B_2$ through the second arm 44 and, ultimately, through the second aperture 56 toward the first aperture 50. The particular arrangement and angle-of-attack of the mirrors 20A, 20B, 20C, 20D may be dictated by the shape of the second arm 44, among other possible factors. Furthermore, while only four mirrors 20A, 20B, 20C, 20D are shown, fewer or additional mirrors may be used without departing from the scope of the present disclosure.

The mirrors 18A, 18B, 20A, 20B, 20C, 20D, specifically mirror 18B and mirror 20D, may align the first beam $B_1$ with the second beam $B_2$ such that the first beam $B_1$ enters the second beam $B_2$ (and vice versa). Therefore, the mirrors 18A, 18B, 20A, 20B, 20C, 20D may direct the first and second beams $B_1$, $B_2$ into a closed (total) optical path $P_T$, which may be a non-circular ring. The closed optical path $P_T$ may extend through the measurement zone 58.

Still referring to FIG. 1, the second set of mirrors 20A, 20B, 20C, 20D are arranged differently than the first set of mirrors 18A, 18B. Specifically, the second set of mirrors 20A, 20B, 20C, 20D are arranged to create a longer optical path within the second arm 44 of the housing 12. Therefore, the portion of the closed optical path $P_T$ residing within the second arm 44 is greater than the portion of the closed optical path $P_T$ residing within the first arm 42.

At this point, those skilled in the art will appreciate that a longer optical path within the second arm 44 of the housing 12 may be achieved using a second arm 44 that is longer than the first arm 42, while still maintaining facing alignment of the second aperture 56 with the first aperture 50. However, when the support structure 30 is robotic, such an asymmetric structure may establish moments of inertia that can create inefficiencies (e.g., greater settling time for the robotic support structure 30).

Figure 3:
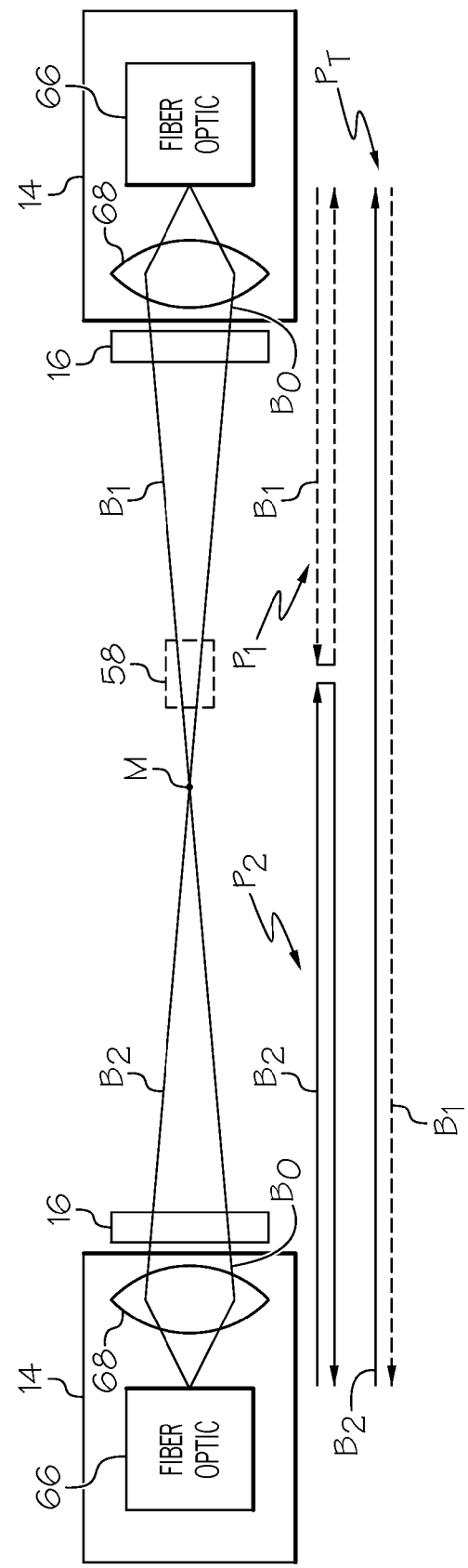
FIG. 3 is an unfolded view of the ring laser measurement apparatus of FIG. 1.

Referring now to FIGS. 1 and 3, because a greater portion of the closed optical path $P_T$ resides within the second arm 44 of the housing 12 (compared to the first arm 42), the midpoint M of the closed optical path $P_T$ is offset from (e.g., outside of) the measurement zone 58. As shown in FIG. 3, the lens 68 within the laser radar unit 14 may focus the laser beam $B_0$ (ultimately, the first and second beams $B_1$, $B_2$) at the midpoint M. Therefore, a confocal system may be established wherein one focal point is at the fiber optic 66 of the laser radar unit 14 and another focal point is at the midpoint M of the closed optical path $P_T$.

Referring to FIG. 2, when a part 100 is positioned in the measurement zone 58 and breaks the closed optical path $P_T$, the first beam $B_1$ travels a first optical path $P_1$ and the second beam $B_2$ travels a second optical path $P_2$. The part 100 may be supported by a support structure 102, which may facilitate moving the part 100 to the measurement zone 58. For example, the support structure 102 may include a transfer rail or the like to facilitate moving the part 100 to the measurement zone 58.

Thus, the thickness T of the part 100, specifically the thickness T at the location on the part 100 where the first and second beams $B_1$, $B_2$ contact the part 100, may be calculated as follows:

$$T = L_T - L_1 - L_2 \quad \text{(Eq. 1)}$$

wherein $L_T$ is the total length of the closed optical path $P_T$, $L_1$ is the distance the first beam $B_1$ travels to the part 100 (e.g., one-half of the total length of $P_1$), and $L_2$ is the distance the second beam $B_2$ travels to the part 100 (e.g., one-half of the total length of $P_2$). The total length $L_T$ of the closed optical path $P_T$ may be determined by the laser radar unit 14 prior to the part 100 breaking the closed optical path $P_T$, while length $L_1$ and length $L_2$ may be determined by the laser radar unit 14 after the part 100 breaks the closed optical path $P_T$.

Because the midpoint M of the closed optical path $P_T$ is offset from the measurement zone 58, the first optical path $P_1$ will be shorter than the second optical path $P_2$. Without being limited to any particular theory, configuring the disclosed ring laser measurement apparatus 10 such that the first optical path $P_1$ is different (e.g., shorter) than the second optical path $P_2$ may enable the processor 60 of the laser radar unit 14 (or at least may enhance the ability of the processor 60) to process the first and second beams $B_1$, $B_2$ to obtain a distance measurement. For example, if the difference between the first and second optical paths $P_1$, $P_2$ is not of a sufficient magnitude, then it may be significantly difficult (e.g., not reasonably possible) for two fast Fourier transform (FFT) algorithm, running simultaneously, to differentiate between the two signals.

At this point, those skilled in the art will appreciate that faster processing by the laser radar unit 14 may be particularly advantageous. For example, ambient breezes may cause the part 100 (FIG. 2) to move (e.g., sway), particularly when the part 100 is large, such as an aircraft wing. The faster the laser radar unit 14 is capable of processing the first and second beams $B_1$, $B_2$, the less impact movement of the part 100 may have on the accuracy of the thickness measurement.

Thus, the difference between the length of the first optical path $P_1$ and the length of the second optical path $P_2$ may be of a sufficient magnitude to facilitate effective processing of both signals. Without being limited to any particular theory, the difference between the length of the first optical path $P_1$ and the length of the second optical path $P_2$ may be of a sufficient magnitude to ensure that the difference in beat frequencies do not coincide when measuring a part 100 (FIG. 2).

In one expression, the difference between the length of the second optical path $P_2$ and the length of the first optical path $P_1$ may be greater than or equal to the distance D between the distal end 48 of the first arm 42 and the distal end 54 of the second arm 44 (e.g., the length (distance D) of the measurement zone 58, which extends from aperture 50 to aperture 56). In another expression, the difference between the length of the second optical path $P_2$ and the length of the first optical path $P_1$ may be at least two percent greater than the distance D between the distal end 48 of the first arm 42 and the distal end 54 of the second arm 44. In another expression, the difference between the length of the second optical path $P_2$ and the length of the first optical path $P_1$ may be at least five percent greater than the distance D between the distal end 48 of the first arm 42 and the distal end 54 of the second arm 44. In another expression, the difference between the length of the second optical path $P_2$ and the length of the first optical path $P_1$ may be at least ten percent greater than the distance D between the distal end 48 of the first arm 42 and the distal end 54 of the second arm 44. In another expression, the length of the second optical path $P_2$ may be at least 2 feet greater than the length of the first optical path $P_1$. In yet another expression, the length of the second optical path $P_2$ may be at least 5 feet greater than the length of the first optical path $P_1$.

Figure 5:
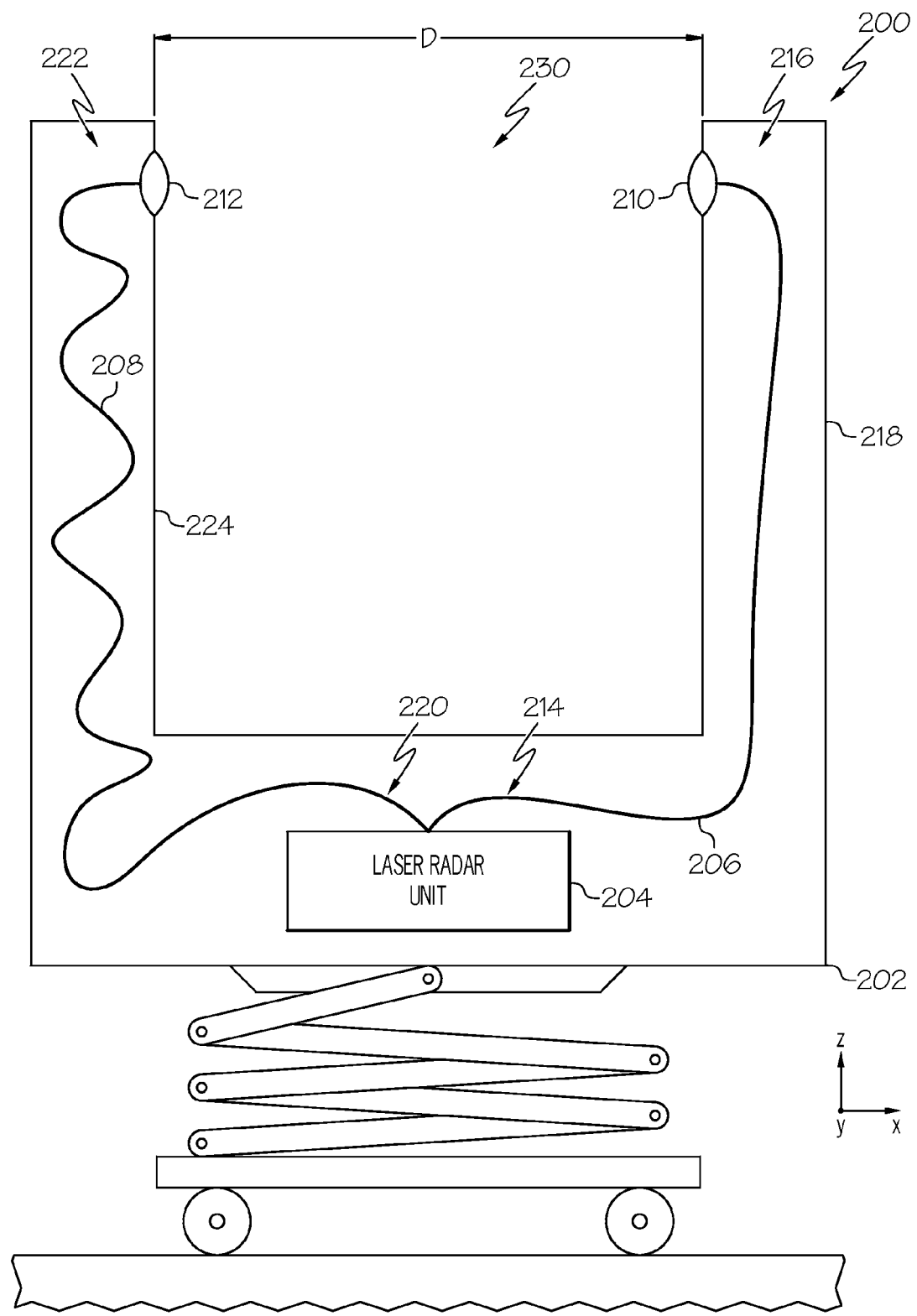
FIG. 5 is a schematic representation of another embodiment of the disclosed ring laser measurement apparatus.

Referring to FIG. 5, another embodiment of the disclosed ring laser measurement apparatus, generally designated 200, may include a housing 202, a laser radar unit 204, a first optical fiber 206 and second optical fiber 208. Additionally, the ring laser measurement apparatus may include a first lens 210 associated with the first optical fiber 206 and a second lens 212 associated with the second optical fiber 208.

The first optical fiber 206 may include a proximal end 214 and a distal end 216. The proximal end 214 of the first optical fiber 206 may be optically coupled with the laser radar unit 204 to receive a first portion of the laser beam, which corresponds to the first beam. The first optical fiber 206 may extend through a first arm 218 of the housing 202 such that the distal end 216 is aligned with the first lens 210.

The second optical fiber 208 may include a proximal end 220 and a distal end 222. The proximal end 220 of the second optical fiber 208 may be optically coupled with the laser radar unit 204 to receive a second portion of the laser beam, which corresponds to the second beam. The second optical fiber 208 may extend through a second arm 224 of the housing 202 such that the distal end 222 is aligned with the second lens 212.

The second optical fiber 208 may be longer than the first optical fiber 206. The difference between the length of the second optical fiber 208 and the length of the first optical fiber 206 may depend on the distance D between the distal end 216 of the first optical fiber 206 and the distal end 222 of the second optical fiber 208 (e.g., the length (distance D) of the measurement zone 230, which extends from lens 210 to lens 212). In one expression, the difference between the length of the second optical fiber 208 and the length of the first optical fiber 206 may be greater than or equal to one-half of the distance D between the distal end 216 of the first optical fiber 206 and the distal end 222 of the second optical fiber 208. In another expression, the difference between the length of the second optical fiber 208 and the length of the first optical fiber 206 may be equal to the distance D between the distal end 216 of the first optical fiber 206 and the distal end 222 of the second optical fiber 208. In yet another expression, the difference between the length of the second optical fiber 208 and the length of the first optical fiber 206 may be greater than the distance D between the distal end 216 of the first optical fiber 206 and the distal end 222 of the second optical fiber 208.

The second arm 224 of the housing 202 may be laterally spaced a distance D from the first arm 218 such that the distal end 222 of the second optical fiber 208 is in facing alignment with the distal end 216 of the first optical fiber 206. When the laser radar unit 204 emits a laser beam, the laser beam may be split between the first and second optical fibers 206, 208. The alignment of the distal ends 216, 222 of the first and second optical fibers 206, 208 may ensure that the beam traveling through the first optical fiber 206 enters the beam traveling through the second optical fiber 208 (and vice versa), thereby forming a closed optical path, which may be a non-circular ring. Therefore, a measurement zone 230 may be defined between the distal ends 216, 222 of the first and second optical fibers 206, 208. The measurement zone 230 may have a length corresponding to distance D.

The first and second lenses 210, 212, while optional, may be positioned proximate (at or near) the distal ends 216, 222 of the first and second optical fibers 206, 208 to facilitate achieving facing alignment of the distal ends 216, 222 of the first and second optical fibers 206, 208 and, as such, formation of the closed optical path. In one construction, the first and second lenses 210, 212 may be focusing lenses. Therefore, the beams exiting the distal ends 216, 222 of the first and second optical fibers 206, 208 may be focused within the measurement zone 230 (e.g., at the center of the measurement zone 230). In another construction, the first and second lenses 210, 212 may be collimating lenses. Therefore, collimated beams may span the measurement zone 230.

Thus, when a part (see part 100 in FIG. 2) is positioned in the measurement zone 230, the part breaks the closed optical path, thereby reflecting a first beam back through the first optical fiber 206 and a second beam back through the second optical fiber 208. The closed optical path will have a known length, which may be calculated by the laser radar unit 204. The distance the first beam travels to the part (by way of the first optical fiber 206) and the distance the second beam travels to the part (by way of the second optical fiber 208) may also be calculated by the laser radar unit 204. The second beam (traveling through the second optical fiber 208) will travel a longer distance than the first beam (traveling through the first optical fiber 206). Therefore, the thickness of the part may then be calculated using Equation 1, above.

Figure 6:
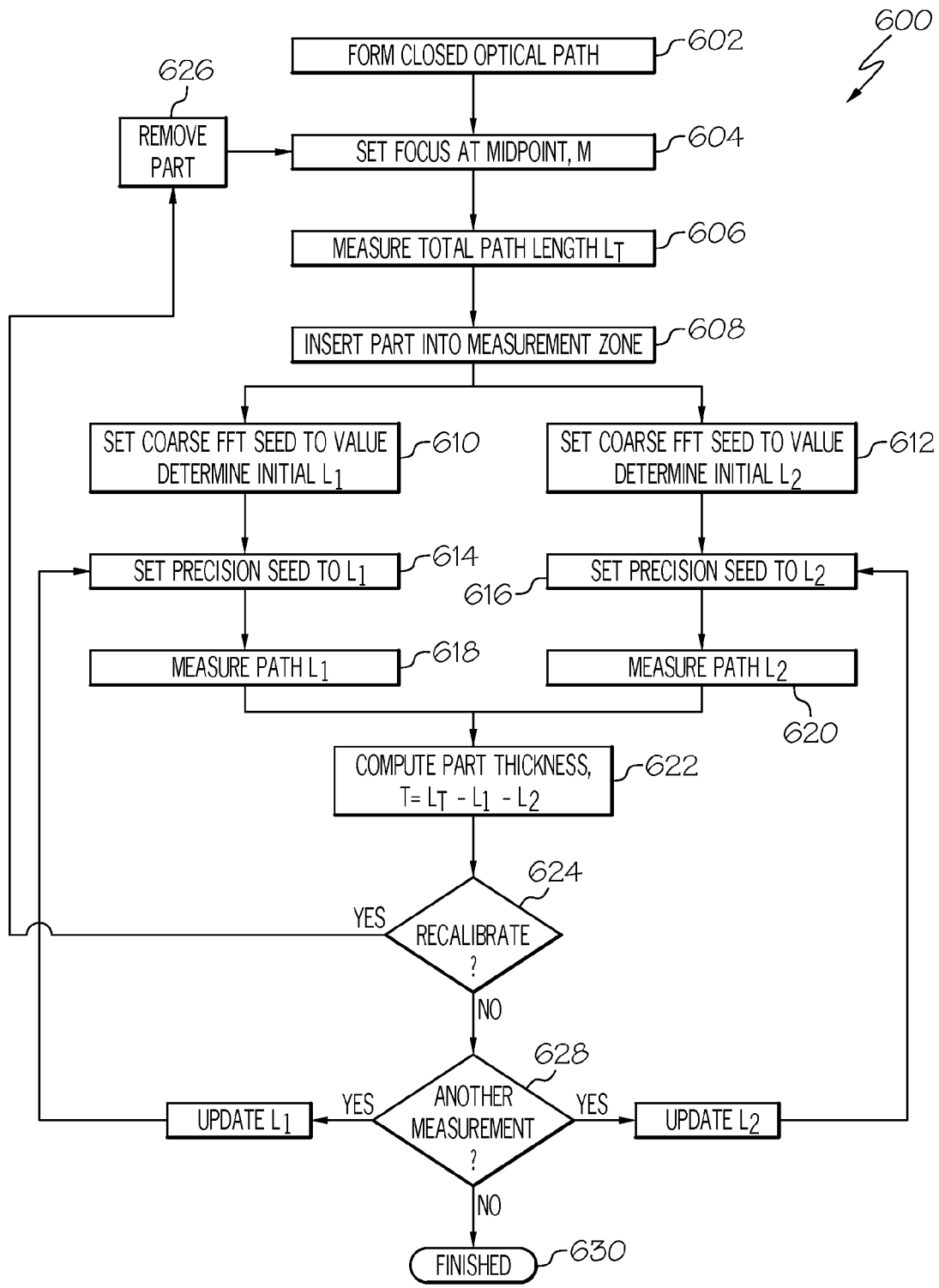
FIG. 6 is a flow diagram depicting one embodiment of the disclosed ring laser measurement method.

Referring to FIG. 6, also disclosed is a method, generally designated 600, for measuring the thickness of a part. The method may begin at Block 602 with the step of forming a closed optical path. The closed optical path may be formed by splitting a beam from a laser radar unit into a first beam and a second beam, and then aligning the first and second beams such that they enter each other to form the closed optical path.

At Block 604, the focus of the laser radar unit may optionally be set. For example, the focus of the laser radar unit may be set to correspond with the midpoint (see midpoint M in FIGS. 1 and 3) of the closed optical path. However, using a fixed focus is also contemplated.

At Block 606, the total length $L_T$ (see Equation 1) of the closed optical path may be measured. For example, two fast Fourier transform (FFT) algorithms, running simultaneously, may be used to process the signals associated with the first and second beams forming the closed optical path.

At Block 608, a part may be positioned in the measurement zone of the closed optical path. The measurement zone may be offset from the midpoint (see midpoint M in FIGS. 1 and 3) of the closed optical path. Therefore, the part will break the closed optical path and establish two separate optical paths (a first optical path and a second optical path). Because the measurement zone is offset from the midpoint of the closed optical path, the first optical path will be different from the second optical path.

At Blocks 610, a coarse fast Fourier transform seed for the first beam may be set to a certain value and an initial estimated distance $L_1$ (the distance the first beam travels to the part) may be calculated. At Block 612, a coarse fast Fourier transform seed for the second beam may be set to a certain value and an initial estimated distance $L_2$ (the distance the second beam travels to the part) may be calculated. The steps associated with Blocks 610, 612 may be simultaneously performed by the laser radar unit.

At Block 614, a precision fast Fourier transform seed for the first beam may be set to the computed value of $L_1$ determined during the previous step (Block 610). Likewise, at Block 616, a precision fast Fourier transform seed for the second beam may be set to the computed value of $L_2$ determined during the previous step (Block 612).

At Block 618, the distance $L_1$ the first beam travels to the part may be calculated. At Block 620, the distance $L_2$ the second beam travels to the part may be calculated. The steps associated with Blocks 618, 620 may be simultaneously performed by the laser radar unit.

At Block 622, the thickness T of the part may be calculated using Equation 1. Specifically, the thickness T of the part may be calculated by subtracting from the total length $L_T$ of the closed optical path the distances the first and second beams travel to the part (e.g., one-half of the first optical path and one-half of the second optical path).

At Blocks 624, 626, an optional recalibration may be performed. If no recalibration (Block 624) is desired and no further measurements are to be taken (Block 628), then the method 600 may come to an end at Block 630. If an additional measurement is desired (Block 628), then, as shown in Blocks 632, 634, the current values for distances $L_1$, $L_2$ may be used as the precision fast Fourier transform seeds (Blocks 614, 616).

Accordingly, the disclosed ring laser measurement apparatus 10 and method 600 provide simple and efficient means from measuring the thickness of a part. Significantly, the disclosed ring laser measurement apparatus 10 and method 600 may provide a thickness measurement without the need for contacting the part.

Figure 7:
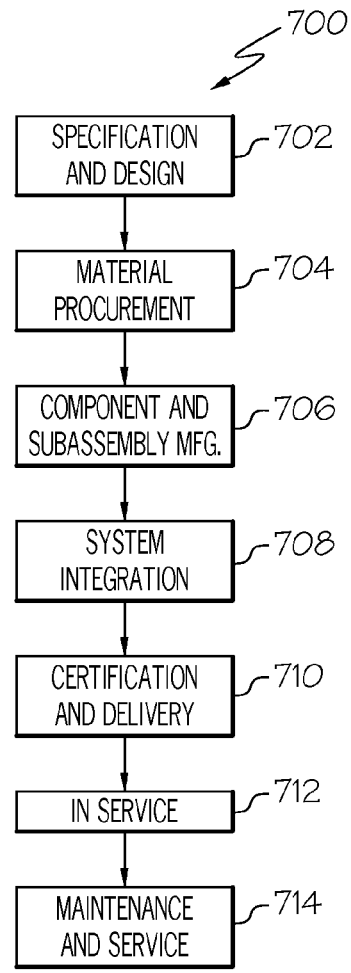
FIG. 7 is a flow diagram of an aircraft manufacturing and service methodology.
Figure 8:
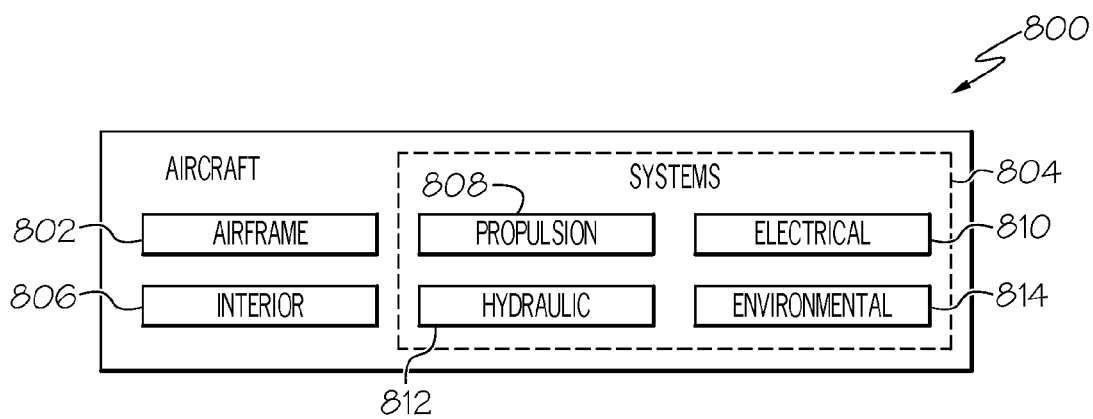
FIG. 8 is a block diagram of an aircraft.

Examples of the present disclosure may be described in the context of an aircraft manufacturing and service method 700 as shown in FIG. 7 and an aircraft 800 as shown in FIG. 8. During pre-production, the illustrative method 700 may include specification and design, as shown at block 702, of the aircraft 800 and material procurement, as shown at block 704. During production, component and subassembly manufacturing, as shown at block 706, and system integration, as shown at block 708, of the aircraft 800 may take place. Thereafter, the aircraft 800 may go through certification and delivery, as shown block 710, to be placed in service, as shown at block 712. While in service, the aircraft 800 may be scheduled for routine maintenance and service, as shown at block 714. Routine maintenance and service may include modification, reconfiguration, refurbishment, etc. of one or more systems of the aircraft 800.

Each of the processes of illustrative method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 800 produced by illustrative method 700 (FIG. 7) may include airframe 802 with a plurality of high-level systems 804 and interior 806. Examples of high-level systems 804 may include one or more of propulsion system 808, electrical system 810, hydraulic system 812, and environmental system 814. Any number of other systems may be included. Although an aerospace example is shown, the principles disclosed herein may be applied to other industries, such as the automotive and marine industries. Accordingly, in addition to the aircraft 800, the principles disclosed herein may apply to other vehicles (e.g., land vehicles, marine vehicles, space vehicles, etc.).

The disclosed ring laser measurement apparatus and method may be employed during any one or more of the stages of the manufacturing and service method 700. For example, components or subassemblies corresponding to component and subassembly manufacturing (block 706) may be fabricated or manufactured using the disclosed ring laser measurement apparatus and method. Also, the disclosed ring laser measurement apparatus and method may be utilized during production stages (blocks 706 and 708), for example, by substantially expediting assembly of or reducing the cost of aircraft 800. Similarly, the disclosed ring laser measurement apparatus and method may be utilized, for example and without limitation, while aircraft 800 is in service (block 712) and/or during the maintenance and service stage (block 714).

Although various embodiments of the disclosed ring laser measurement apparatus and method have been shown and described, modifications may occur to those skilled in the art upon reading the specification. The present application includes such modifications and is limited only by the scope of the claims.

What is claimed is:

1. A measurement apparatus comprising:
a housing comprising a first arm and a second arm spaced apart from said first arm to define a measurement zone therebetween, said measurement zone having a length; and
a laser radar unit, wherein said laser radar unit emits a laser beam and said laser beam is split into a first beam and a second beam, said first beam travels through said first arm, across said measurement zone and into said second arm, returning to said laser radar unit, while said second beam travels through said second arm, across said measurement zone and into said first arm, returning to said laser radar unit, thereby forming a closed optical path comprising said first beam and said second beam, and
wherein said closed optical path comprises a midpoint, said midpoint being offset from said measurement zone such that said first beam travels a first optical path and said second beam travels a second optical path when said closed optical path is broken by a part positioned in said measurement zone, said second optical path being greater than said first optical path by at least said length.

2. The measurement apparatus of claim 1 wherein said housing comprises a base portion, and wherein said laser radar unit is at least partially positioned within said base portion.

3. The measurement apparatus of claim 2 wherein said first arm comprises a distal end and a proximal end, said proximal end of said first arm being connected to said base portion, wherein said second arm comprises a distal end and a proximal end, said proximal end of said second arm being connected to said base portion, and wherein said distal end of said first arm and said distal end of said second arm define said measurement zone.

4. The measurement apparatus of claim 3 wherein said distal end of said first arm is spaced at least 1 foot from said distal end of said second arm.

5. The measurement apparatus of claim 1 further comprising a beam splitter positioned to split said laser beam into said first beam and said second beam.

6. The measurement apparatus of claim 1 further comprising a plurality of mirrors arranged to direct said first beam and said second beam into said closed optical path.

7. The measurement apparatus of claim 1 further comprising a first optical fiber optically coupled with the laser radar unit to receive a first portion of said laser beam corresponding to said first beam.

8. The measurement apparatus of claim 7 further comprising a second optical fiber optically coupled with the laser radar unit to receive a second portion of said laser beam corresponding to said second beam.

9. The measurement apparatus of claim 8 further comprising a first lens positioned proximate a distal end of said first optical fiber and a second lens positioned proximate a distal end of said second optical fiber.

10. The measurement apparatus of claim 9 wherein said first lens and said second lens are collimating or focusing lenses.

11. The measurement apparatus of claim 1 wherein said measurement zone has a first length, wherein said second optical path is longer than said first optical path by a second length, and wherein said second length is at least 2 percent greater than said first length.

12. The measurement apparatus of claim 1 wherein said measurement zone has a first length, wherein said second optical path is longer than said first optical path by a second length, and wherein said second length is at least 5 percent greater than said first length.

13. The measurement apparatus of claim 1 wherein said measurement zone has a first length, wherein said second optical path is longer than said first optical path by a second length, and wherein said second length is at least 10 percent greater than said first length.

14. A measurement apparatus comprising:
a housing comprising a first arm and a second arm spaced apart from said first arm to define a measurement zone therebetween, said measurement zone having a length;
a laser radar unit, wherein said laser radar unit emits a laser beam;
a beam splitter positioned to split said laser beam into a first beam and a second beam; and
a plurality of mirrors arranged to direct said first beam into said second beam to form a closed optical path that extends through said measurement zone, said closed optical path comprising a midpoint, wherein said midpoint is outside of said measurement zone, and wherein said midpoint is spaced from said measurement zone such that said first beam travels a first optical path and said second beam travels a second optical path when said closed optical path is broken by a part positioned in said measurement zone, and wherein said second optical path is longer than said first optical path by at least said length of said measurement zone.

15. A measurement apparatus comprising:
a housing comprising a first arm and a second arm spaced apart from said first arm to define a measurement zone therebetween, said measurement zone having a length;
a laser radar unit, wherein said laser radar unit emits a laser beam;
a first optical fiber optically coupled with said laser radar unit to receive a first portion of said laser beam corresponding to a first beam, said first optical fiber extending through said first arm; and
a second optical fiber optically coupled with said laser radar unit to receive a second portion of said laser beam corresponding to a second beam, said second optical fiber extending through said second arm and being longer than said first optical fiber,
wherein said first beam exits said first optical fiber, travels across said measurement zone and enters said second optical fiber, and said second beam exits said second optical fiber, travels across said measurement zone and enters said first optical fiber, thereby forming a closed optical path, and
wherein said first beam travels a first optical path and said second beam travels a second optical path when said closed optical path is broken by a part positioned in said measurement zone, and wherein said second optical path is longer than said first optical path by at least said length of said measurement zone.

16. A method for measuring a thickness of a part using a laser radar unit that emits a laser beam, the method comprising:
splitting said laser beam into a first beam and a second beam;
directing said first beam into said second beam to form a closed optical path, said closed optical path comprising a total length, wherein said closed optical path extends across a measurement zone having a length;
breaking said closed optical path in said measurement zone with said part such that said first beam travels in a first optical path having a first length and said second beam travels in a second optical path having a second length, wherein said second length is greater than said first length by at least said length of said measurement zone; and
calculating said thickness based on said total length, said first length and said second length.

17. The measurement apparatus of claim 14 wherein said second optical path is longer than said first optical path by at least said length of said measurement zone plus 5 percent.

18. The measurement apparatus of claim 14 wherein said second optical path is longer than said first optical path by at least said length of said measurement zone plus 10 percent.

19. The measurement apparatus of claim 15 wherein said second optical path is longer than said first optical path by at least said length of said measurement zone plus 5 percent.

20. The measurement apparatus of claim 15 wherein said second optical path is longer than said first optical path by at least said length of said measurement zone plus 10 percent.

* * * * *